United States Patent [19]

L'Eplattenier et al.

[11] 4,065,481
[45] Dec. 27, 1977

[54] 1:1-AZOMETHINE-METAL-COMPLEX DYESTUFFS

[75] Inventors: François L'Eplattenier, Therwil; Laurent Vuitel, Monthey, both of Switzerland

[73] Assignee: Ciba-Geigy Corporation, Ardsley, N.Y.

[21] Appl. No.: 640,373

[22] Filed: Dec. 12, 1975

[30] Foreign Application Priority Data

Dec. 17, 1974 Switzerland .................. 16810/74

[51] Int. Cl.² ............................................. C07F 1/08
[52] U.S. Cl. .................................. 260/438.1; 8/42 R;
106/288 Q; 260/149; 260/151; 260/270 R;
260/299; 260/343.21; 542/417
[58] Field of Search ............ 260/429 C, 438.1, 439 R,
260/429.9

[56] References Cited

U.S. PATENT DOCUMENTS 3,845,014  10/1974  Frank et al. .................. 260/438.1
3,894,083  7/1975   Hofer et al. .................. 260/439 R Primary Examiner—Helen M. S. Sneed
Attorney, Agent, or Firm—Vincent J. Cavalieri

[57] ABSTRACT

1:1-Metal complexes of azomethines of the formula I

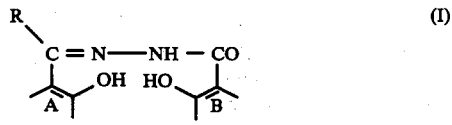

wherein A and B are isocyclic or heterocyclic aromatic radicals, with however only one of the radicals A and B being a benzene ring, R represents a hydrogen atom, an alkyl group containing 1 to 6 carbon atoms, or an aryl radical, and the complexing metal ions are bivalent cations of the transition metals, zinc ions or cadmium ions which are useful for pigmenting high molecular organic material.

6 Claims, No Drawings

1:1-AZOMETHINE-METAL-COMPLEX DYESTUFFS

It has been found that new valuable 1:1-metal complexes of azomethines are obtained when an azomethine of the formula I

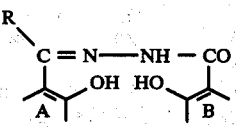

wherein A and B are isocyclic or heterocyclic aromatic radicals, with however only one of the radicals A and B being a benzene ring, and R represents a hydrogen atom, an alkyl group containing 1 – 6 carbon atoms, or an aryl radical, is complexed with a compound releasing a bivalent transition-metal cation, a zinc ion or cadmium ion.

Of particular interest are 1:1-metal complexes of azomethines of the formula I wherein R represents a hydrogen atom or a methyl radical, A or B represent a benzene radical, and A and B represent naphthalene, pyridine, pyrimidine, pyrazole, quinoline, isoquinolone or coumarin radicals, with the radicals A and B also being able to be substituted by halogen atoms, hydroxy, alkyl, aryl, alkoxy, nitro, cyano, phenylazo, carboxy, alkoxycarbonyl or carbamoyl groups, and the complexing metal ions being bivalent ions of zinc, cobalt, nickel or copper.

Especially valuable are 1:1-copper-II-complexes of azomethines of the formula

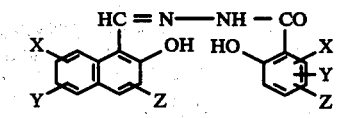

or of the formula

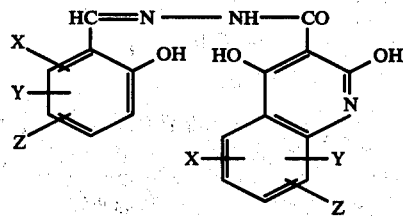

wherein X, Y and Z represent hydrogen atoms, chlorine atoms or bromine atoms, hydroxy groups, alkyl or alkoxy radicals containing 1 – 4 carbon atoms, nitro or cyano radicals, carboxy or carbamoyl groups, alkoxycarbonyl or alkyl or arylcarbamoyl groups containing 2 – 12 carbon atoms.

The azomethines of the formula I that are used as starting materials are obtained by reaction of an o-hydroxy compound of the formula IV

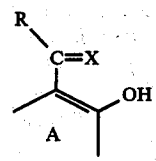

wherein X represents the group O or $NR_1$, and $R_1$ represents an alkyl or aryl radical, with an o-hydroxycarboxylic acid hydrazide of the formula V

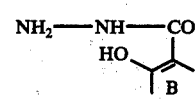

The following may be mentioned as examples of o-hydroxy compounds of the formula IV to be used:

salicylaldehyde,
4-chloro-2-hydroxybenzaldehyde,
5-chloro-2-hydroxybenzaldehyde,
3-nitro-2-hydroxybenzaldehyde,
5-nitro-2-hydroxybenzaldehyde,
3,5-dichloro-2-hydroxybenzaldehyde,
3,5-dibromo-2-hydroxybenzaldehyde,
5-phenylazo-2-hydroxybenzaldehyde,
5-(2'-chlorophenylazo)-2-hydroxybenzaldehyde,
5-(2',5'-dichlorophenylazo)-2-hydroxybenzaldehyde,
5-(2'-methyl-phenylazo)-2-hydroxybenzaldehyde,
5-(2'-methoxy-phenylazo)-2-hydroxybenzaldehyde,
5-(2'-methoxy-4'-nitro-phenylazo)-2-hydroxybenzaldehyde,
5-(2'-methoxy-5'-carbamoyl-phenylazo)-2-hydroxybenzaldehyde,
2-hydroxynaphthaldehyde,
6-bromo-2-hydroxynaphthaldehyde,
5-nitro-2-hydroxynaphthaldehyde,
2-hydroxy-3-carboxy-naphthaldehyde,
2-hydroxy-3-methoxycarbonyl-naphthaldehyde,
2-hydroxy-3-phenylcarbamoyl-naphthaldehyde,
2-hydroxy-3-(4'-chlorophenylcarbamoyl)-naphthaldehyde,
2-hydroxy-3-(4'-chloro-2'-methylphenylcarbamoyl)-naphthaldehyde,
2-hydroxy-3-(2',5'-dimethoxy-3'-chlorophenylcarbamoyl)-naphthaldehyde,
2-hydroxy-6-bromo-3-carboxynaphthaldehyde,
2-hydroxy-6-bromo-3-phenylcarbamoylnaphthaldehyde,
2,6-dihydroxy-4-methyl-5-cyano-3-pyridinealdehyde,
2,6-dihydroxy-4-methyl-5-carbamoyl-3-pyridinealdehyde,
2,4-dihydroxy-3-quinolinealdehyde,
5-chloro-2,4-dihydroxy-3-quinolinealdehyde,
6-chloro-2,4-dihydroxy-3-quinolinealdehyde,
7-chloro-2,4-dihydroxy-3-quinolinealdehyde,
8-chloro-2,4-dihydroxy-3-quinolinealdehyde,
6,8-dichloro-2,4-dihydroxy-3-quinolinealdehyde,
7,8-dichloro-2,4-dihydroxy-3-quinolinealdehyde,
6-methyl-2,4-dihydroxy-3-quinolinealdehyde,
7-methyl-2,4-dihydroxy-3-quinolinealdehyde,
8-methyl-2,4-dihydroxy-3-quinolinealdehyde,
2,4-dihydroxy-3-acetyl-quinoline,
2,4-dihydroxy-3-acetyl-6-methyl-quinoline,
2,4-dihydroxy-3-acetyl-6-chloroquinoline,
3-hydroxy-4-isoquinolonealdehyde, N-methyl-3-hydroxy-4-isoquinolonealdehyde,
N-phenyl-3-hydroxy-4-isoquinolonealdehyde,
N-naphthyl-3-hydroxy-4-isoquinolonealdehyde,
2-methyl-4,6-dihydroxy-5-pyrimidinealdehyde,
2-phenyl-4,6-dihydroxy-5-pyrimidinealdehyde,
2,4,6-trihydroxy-5-pyrimidinealdehyde,
4-hydroxy-3-quinaldinealdehyde,
6-chloro-4-hydroxy-3-quinaldinealdehyde,
6-methoxy-4-hydroxy-3-quinaldinealdehyde,
6-methyl-4-hydroxycoumarin-3-aldehyde,
6-chloro-4-hydroxycoumarin-3-aldehyde,
5,7-dimethyl-6-chloro-4-hydroxycoumarin-3-aldehyde,
4-hydroxycoumarin-3-aldehyde,
1-phenyl-3-methyl-4-formyl-5-hydroxy-pyrazole,
1-phenyl-3-carboxy-4-formyl-5-hydroxy-pyrazole,
1-phenyl-3-carbamoyl-4-formyl-5-hydroxy-pyrazole,
1-phenyl-3-methoxycarbonyl-4-formyl-5-hydroxypyrazole,
1-phenyl-3-ethoxycarbonyl-4-formyl-5-hydroxypyrazole,
1-(2'-chlorophenyl)-3-methyl-4-formyl-5-hydroxypyrazole,
1-(4'-chlorophenyl)-3-methyl-4-formyl-5-hydroxypyrazole,
1-(2'-methylphenyl)-3-methyl-4-formyl-5-hydroxypyrazole,
1-(4'-methylphenyl)-3-methyl-4-formyl-5-hydroxypyrazole.

Instead of the aldehydes or ketones, it is also possible to use the corresponding aldimines, particularly phenylaldimines.

The following are given as examples of o-hydroxycarboxylic acids for the production of the corresponding hydrazides of the formula V:

5-hydroxysalicylic acid,
6-hydroxysalicylic acid,
5-carboxysalicylic acid,
4-trifluoromethylsalicyclic acid,
5-($\beta,\beta,\beta$-trichloro-$\alpha$-hydroxyethyl)-salicylic acid,
4,5-dimethylsalicylic acid,
3,6-dihydroxysalicylic acid,
3-methyl-6-isopropylsalicylic acid,
3,5-dichlorosalicylic acid,
4-methyl-5-bromo(or chloro)-6-hydroxysalicylic acid,
3-bromo(or chloro)-4-methyl-5-bromo(or chloro)-6-hydroxysalicylic acid,
3,5,6-trichlorosalicylic acid,
2-methyl-3-hydroxy-4,5-pyridine-dicarboxylic acid,
8-oxyquinoline-7-carboxylic acid,
3-oxyquinoline-4-carboxylic acid-6-phenyl,
3-oxyquinoline-4-carboxylic acid-6-chlorine,
3-oxyquinoline-4-carboxylic acid-6-phenyl-8-chlorine,
3-oxyquinoline-4-carboxylic acid-6,8-dichlorine,
7-chloro-4-hydroxy-3-carboxy-coumarin.

Examples of preferred compounds that release a bivalent metal ion are the acetate, stearate, chloride, sulphate, nitrate or phosphate of cobalt, nickel, zinc or, in particular, copper.

The complexing (metallising) of the azomethine can be performed also simultaneously with its production by condensation of the compounds of the formulae IV and V in the presence of the compound releasing the metal ion, without isolation of the ligand, preferably in a single-vessel process, in an organic solvent. The following may be mentioned as solvents for the single-vessel process: methyl Cellosolve, glacial acetic acid, dimethylformamide, ethylene glycol and Carbitol. Furthermore, one of the two compounds IV and V can be precoordinated with the metal ion before condensation of the said compound.

The complexing reaction occurs at elevated temperature, preferably between 50° C and the boiling point of the employed solvent.

Since the resulting metal complexes are difficultly soluble in the solvents mentioned, they can be easily isolated by filtration. Any impurities present can be removed by washing.

The new dyestuffs constitute valuable pigments that can be used in the finely divided form for the pigmenting of high-molecular organic material, e.g. cellulose ethers and cellulose esters, such as ethylcellulose, cellulose acetate, cellulose butyrate, natural resins or synthetic resins, such as polymerisation resins or condensation resins, e.g. aminoplasts, especially urea-formaldehyde resins and melamine-formaldehyde resins, alkyd resins, phenoplasts, polycarbonates, polyesters, polyamides or polyurethanes, polyolefins, such as polyethylene or polypropylene, polyvinyl chloride, polystyrene, polyacrylonitrile, polyacrylic acid esters, gum, casein, silicones and silicone resins, singly or in admixtures.

It is of no importance whether the high-molecular compounds mentioned are in the form of plastic materials or melts, or in the form of spinning solutions, lacquers, coating materials or printing inks or pastes. Depending on the purpose of application, it proves advantageous to use the new pigments as toners or in the form of preparations. The preparations can contain, in addition to the pure pigment, for example natural resins such as abietic acid or esters thereof, ethylcellulose, cellulose acetobutyrate, alkaline-earth salts of higher fatty acids, fatty amines such as stearylamine or rosin amine, vinyl chloride/vinyl acetate copolymers, polyacrylonitrile or polyterpene resins, or water-soluble dyestuffs, for example dyestuff sulphonic acids or the alkaline-earth salts thereof.

The dyestuffs obtained are characterised by high tinctorial strength and purity of shade, as well as by good general fastness properties, especially fastness to light, to weather and to migration.

Except where otherwise stated in the following Examples, parts denote parts by weight and percentages percent by weight, and temperature values are given in degrees Centigrade.

A. Production of the Ligands

EXAMPLE 1

4.56 parts of salicyclic acid hydrazide and 5.17 parts of 2-hydroxy-1-naphthaldehyde are stirred in 50 parts by volume of glacial acetic acid for 2 hours at 100°. The reaction product is filtered off at 80°, and the filter residue is well washed with glacial acetic acid and alcohol and subsequently dried. There are obtained 8.15 parts (89% of theory) of a green-yellow powder of the formula

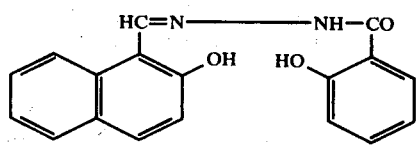

The azomethines of the Examples 2, 3, 5 and 7 (Table 1) are synthesised in an analogous manner.

The ligands of the Examples 4, 6 and 8 are produced by a procedure analogous to that of Example 1 but from the corresponding N-phenylaldimines.

The given formula constituents relate to compounds of the formula

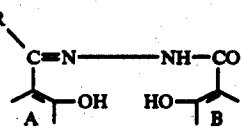

| Example No. | RC= A OH | B OH | Yield |
|---|---|---|---|
| 2 | 1-CH=, 2-OH naphthalene | 3-methyl, 2-OH naphthalene | 96 % |
| 3 | 4-CH=, 3-OH, 2-COOH naphthalene | " | 98 % |
| 4 | 4-CH=, 3-OH, 2-CONH(4-Cl-phenyl) naphthalene | HO-C(=N-)-C(CH₃)=C(OH)-(2-aminophenyl) | 98 % |
| 5 | 1-CH=, 2-OH naphthalene | " | 86 % |
| 6 | CH=, OH, CH₃, H₂NOC, OH pyridine | " | 73 % |
| 7 | CH=, OH, 2,4-dichlorophenol | " | 92 % |
| 8 | HO-C(=N-)-C(CH=)=C(OH)-(2-aminophenyl) | " | 78 % |

| Example No. | RC=\\OH (A) | ⟍OH (B) | Yield |
|---|---|---|---|
| 9 | naphthalene with HOOC, OH, CH= substituents | " | 95 % |
| 10 | chromone-type structure with OH, CH= | " | 95 % |
| 11 | pyrimidine with OH, CH=, OH substituents | " | 88 % |
| 12 | H₃C, CH=, N, OH, N-phenyl pyrazole structure | " | 68 % |
| 13 | phenyl-N=, pyrimidine with OH, CH=, OH | " | 86 % |
| 14 | 4-hydroxy-2-hydroxyquinoline with CH₃, C= | 3-methyl-4-hydroxy-2-hydroxyquinoline | 74 % |
| 15 | 4-hydroxy-2-hydroxyquinoline with phenyl, C= | 3-methyl-4-hydroxy-2-hydroxyquinoline | 79 % |

B. Production of the metal complexes

EXAMPLE 16

1.53 parts of the ligand from the Example 1 are reacted in 50 parts by volume of methyl Cellosolve with 1.0 parts of Cu(CH₃COO)₂.H₂O for 3 hours at 100°. The yellow-green metal complex obtained is filtered off hot; it is then well washed with alcohol and acetone and dried. There are obtained 1.75 parts (95% of theory) of a compound of the composition $C_{18}H_{12}CuN_2O_3$, which corresponds to a 1:1 $Cu^{2+}$-complex of the ligand from Example 1.

| Microanalysis % | C | H | N | Cu |
|---|---|---|---|---|
| calculated | 58.76 | 3.29 | 7.61 | 17.27 |
| found | 58.53 | 3.50 | 7.56 | 16.8 |

The 1:1 $Cu^{2+}$- and $Ni^{2+}$complexes of the Table 2 are produced in an analogous manner; these can also be produced directly from the constituents hydrazide, aldehyde or aldimine and metal ion without isolation of the ligand according to Example 16.

| Example No. | Ligand | $M^{2+}$ | Yield | Shade in PVC |
|---|---|---|---|---|
| 17 | | $Ni^{2+}$ | 93% | yellow |
| 18 | | $Cu^{2+}$ | 91% | yellow-green |
| 19 | | $Ni^{2+}$ | 71% | yellow |
| 20 | | $Cu^{2+}$ | 89% | yellow |
| 21 | | $Cu^{2+}$ | 92% | yellow |
| 22 | | $Cu^{2+}$ | 95% | yellow-green |
| 23 | | $Cu^{2+}$ | 97% | yellow-green |
| 24 | | $Cu^{2+}$ | 82% | yellow-green |

-continued

| Example No. | Ligand | $M^{2+}$ | Yield | Shade in PVC |
|---|---|---|---|---|
| 25 | | $Ni^{2+}$ | 65% | yellow-green |
| 26 | | $Ni^{2+}$ | 65% | yellow-green |
| 27 | | $Cu^+$ | 92% | yellow |
| 28 | | $Cu^{2+}$ | 94% | yellow-green |
| 29 | | $Cu^+$ | 81% | yellow |
| 30 | | $Cu^{2+}$ | 81% | yellow |
| 31 | | $Cu^+$ | 91% | yellow-green |
| 32 | | $Cu^{2+}$ | 79% | yellow-green |

EXAMPLE 33

1.10 parts of 2,4-dihydroxyquinoline-3-carboxylic acid hydrazide and 0.96 part of 3,5-dichlorosalicylaldehyde are reacted in 50 parts by volume of methyl Cellosolve with 1.0 part of Cu(CH$_3$COO)$_2$. H$_2$O for 4 hours at 120°. The resulting yellow-green metal complex is filtered off at 100°, well washed with alcohol and acetone and dried in vacuo at 80°. There are obtained 2.1 parts (91% of theory) of a 1:1 Cu$^{2+}$-complex having the same composition as that in Example 23.

EXAMPLE 34

Single-Vessel Process With Precoordination of a Constituent 4.00 parts of Cu(CH$_3$COO)$_2$.H$_2$O and 3.44 parts of 2-hydroxy-1-naphthaldehyde are stirred in 200 ml of methyl Cellosolve for 30 minutes at 70° C. The thus formed green suspension is subsequently reacted with 3.04 parts of salicyclic acid hydrazide and the reaction mixture is heated fpr 3 hours at 100°. The reaction product is then filtered off at 80°, well washed with alcohol and finally dried. There are obtained 4.6 parts (63% of theory) of a 1:1 Cu$^{2+}$-complex having the same composition as that in Example 16.

The same Cu$^{2+}$-complex is obtained if the hydrazide is precoordinated with the metal ion.

We claim:

1. 1:1-Metal complexes of azomethines of the formula I

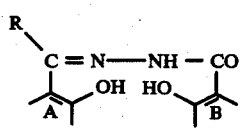

wherein A and B are isocyclic aromatic groups, with however only one of the groups A and B being a benzene ring, R represents a hydrogen atom, an alkyl group containing 1 to 6 carbon atoms, or an aryl group, and the complexing metal ions are bivalent cations of zinc, copper, nickel, colialtor cadmium.

2. 1:1-Azomethine metal complexes according to claim 1, characterised in that R represents a hydrogen atom or a methyl group, A or B represents a benzene group, and A and B represent naphthalene, groups, with the groups A and B being able to be substituted by halogen atoms, hydroxy, alkyl, aryl, alkoxy, nitro, cyano, carboxy, alkoxycarbonyl or carbamoyl groups, and the complexing metal ions being bivalent ions of cobalt, nickel, zinc or copper.

3. 1:1-Azomethine-copper-II-complex, characterised by an azomethine according to the claim 1.

4. 1:1-Azomethine-copper-II-complexes according to claim 3, characterised by an azomethine of the formula II

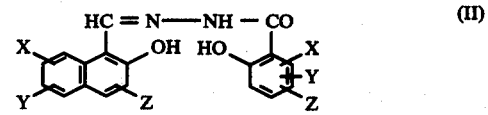

wherein X, Y and Z represent hydrogen atoms, chlorine atoms or bromine atoms, hydroxy groups, alkyl or alkoxy radicals containing 1 - 4 carbon atoms, nitro or cyano groups, carboxy or carbamoyl groups, alkoxycarbonyl or alkyl or arylcarbamoyl groups containing 2 - 12 carbon atoms.

5. 1:1Azomethine-copper-II-complex according to claim 4, characterised by an azomethine of the formula

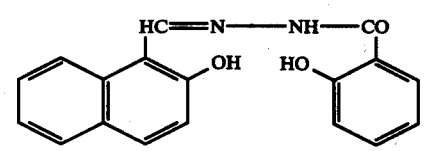

6. 1:1-Azomethine-copper-II-complex according to claim 3, characterised by an azomethine of the formula

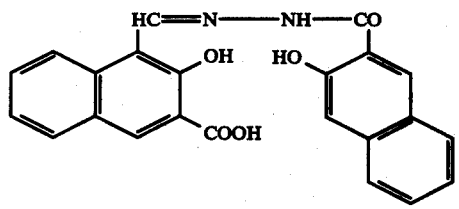

* * * * *